(12) United States Patent
Wang et al.

(10) Patent No.: US 11,589,268 B2
(45) Date of Patent: Feb. 21, 2023

(54) BACKWARD CANCELLATION INDICATION FOR SIDELINK TRANSMISSION

(71) Applicant: QUALCOMM Incorporated, San Diego, CA (US)

(72) Inventors: Xiaojie Wang, Hillsborough, NJ (US); Hua Wang, Basking Ridge, NJ (US); Sony Akkarakaran, Poway, CA (US); Jing Sun, San Diego, CA (US); Juan Montojo, San Diego, CA (US); Junyi Li, Franklin Park, NJ (US); Xiaoxia Zhang, San Diego, CA (US); Piyush Gupta, Bridgewater, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/172,963

(22) Filed: Feb. 10, 2021

(65) Prior Publication Data

US 2022/0256403 A1    Aug. 11, 2022

(51) Int. Cl.
*H04L 1/18* (2006.01)
*H04W 28/26* (2009.01)
(Continued)

(52) U.S. Cl.
CPC ....... *H04W 28/26* (2013.01); *H04W 72/0406* (2013.01); *H04W 72/0446* (2013.01)

(58) Field of Classification Search
None
See application file for complete search history.

(56) References Cited

U.S. PATENT DOCUMENTS

2017/0188391 A1* 6/2017 Rajagopal ......... H04W 28/0284
2018/0206260 A1* 7/2018 Khoryaev ......... H04W 72/1289
(Continued)

FOREIGN PATENT DOCUMENTS

WO    WO-2020197645 A1    10/2020

OTHER PUBLICATIONS

International Search Report and Written Opinion—PCT/US2022/070075—ISA/EPO—dated May 2, 2022.
(Continued)

*Primary Examiner* — Sithu Ko
(74) *Attorney, Agent, or Firm* — Norton Rose Fulbright LLP

(57) ABSTRACT

Systems, apparatus, methods, and computer-readable media that enable and support backward cancellation indication for sidelink transmissions are described. In a situation where a sidelink data transmission with respect to one or more resources previously reserved for sidelink communication is ineffectual, a sidelink transmission user equipment (UE) may indicate the ineffectual data transmission in a transmission opportunity subsequent to the transmission having an ineffectual data transmission, such as by transmitting a backward cancellation indication (BCI). The BCI may provide information to a corresponding sidelink receiver UE regarding the resource with respect to the ineffectual data transmission. The sidelink receiver UE may use information provided by the BCI in determining whether to alter utilization of signals received on resources of the ineffectual data transmission. Other aspects and features are also claimed and described.

27 Claims, 9 Drawing Sheets

(51) Int. Cl.
*H04W 72/04* (2023.01)
*H04W 72/0446* (2023.01)

(56) References Cited

U.S. PATENT DOCUMENTS

| | | | |
|---|---|---|---|
| 2020/0029340 A1 | 1/2020 | He et al. | |
| 2020/0305176 A1* | 9/2020 | Hu | H04L 1/1819 |
| 2021/0168783 A1* | 6/2021 | Islam | H04W 72/042 |
| 2021/0385694 A1* | 12/2021 | Freda | H04W 74/0816 |
| 2022/0141716 A1* | 5/2022 | Chen | H04W 72/02 |
| | | | 370/329 |
| 2022/0174682 A1* | 6/2022 | Li | H04W 72/10 |

OTHER PUBLICATIONS

VIVO: "UL Inter-UE Tx Prioritization for URLLC", 3GPP Draft, 3GPP TSG RAN WG1 #96bis, R1-1904085, 3rd Generation Partnership Project (3GPP), Mobile Competence Centre, 650, Route Des Lucioles, F-06921 Sophia-Antipolis Cedex, France, vol. RAN WG1, Apr. 3, 2019 (Apr. 3, 2019), pp. 1-12, XP051707108, figures 2, 3 sections: 2.5, 2.6.1, 2.6.2, p. 6-8.

* cited by examiner

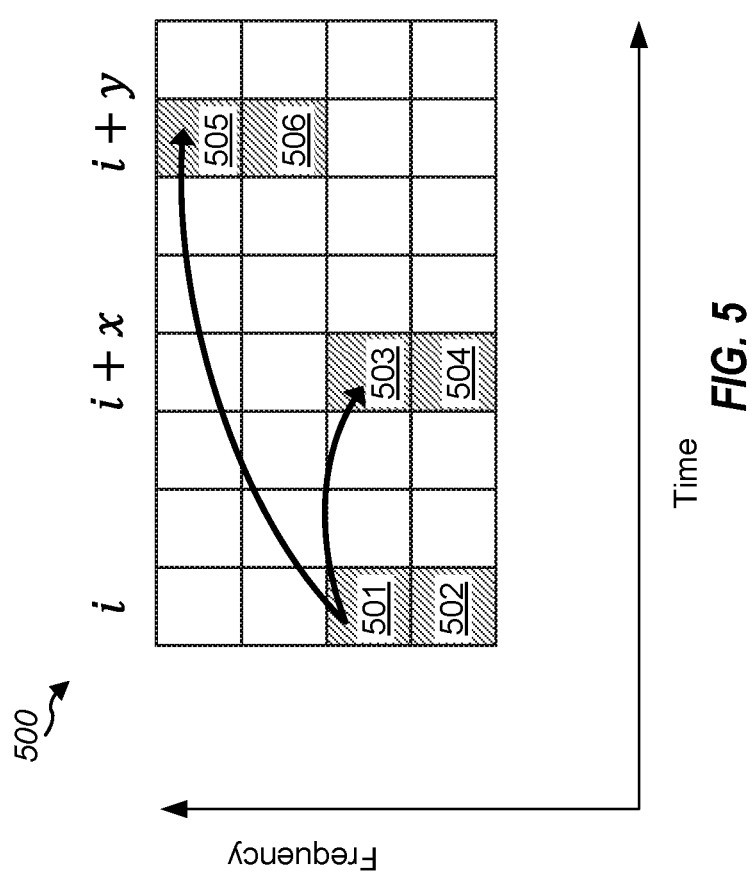

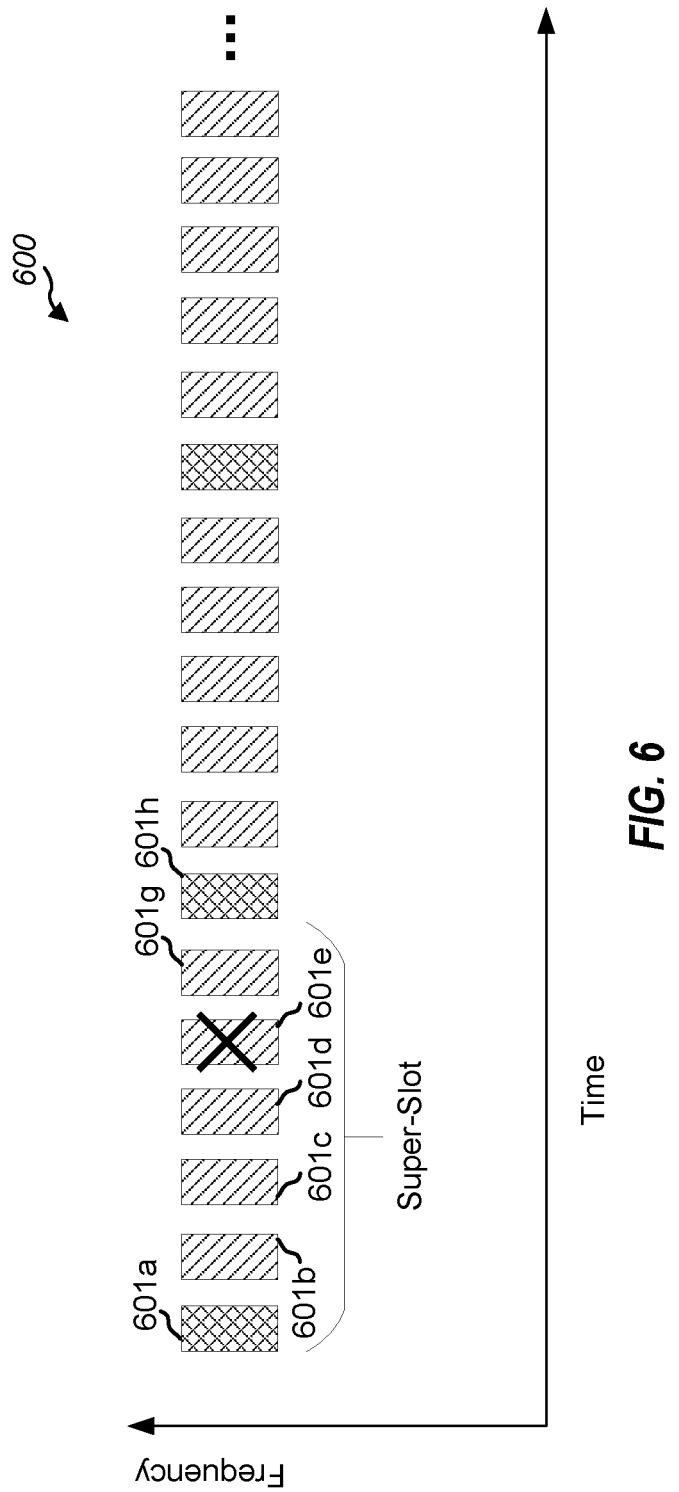

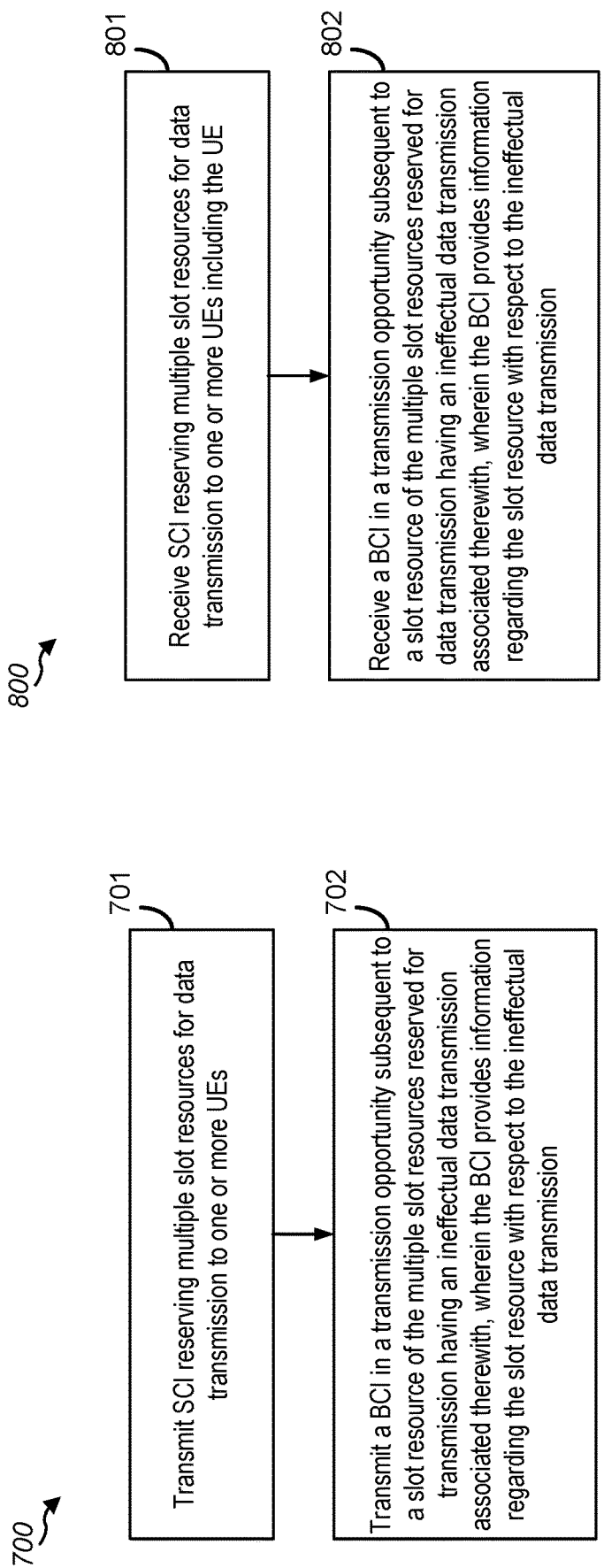

BACKWARD CANCELLATION INDICATION FOR SIDELINK TRANSMISSION

TECHNICAL FIELD

Aspects of the present disclosure relate generally to wireless communication systems, and more particularly, to user equipment (UE) sidelink communication. Certain embodiments of the technology discussed below can enable and provide backward cancellation indication for UE sidelink transmission.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters.

In addition to communicating with network base stations, a UE may implement a sidelink with respect to one or more other UEs. Such a sidelink provides communication link directly between UEs. Accordingly, a UE may communicate directly with one or more base stations and/or one or more other UEs. A UE may, for example, communicate directly with a base station using a UE to UMTS (Uu) interface. A sidelink may be implemented using a UE to UE interface such as a PC5 interface of a vehicle-to-everything (V2X) mesh network.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include transmitting sidelink control information (SCI) reserving multiple slot resources for data transmission to one or more UEs. The method may also include transmitting a backward cancellation indication (BCI) in a transmission opportunity subsequent to a slot resource of the multiple slot resources reserved for transmission having an ineffectual data transmission associated therewith. The BCI may provide information regarding the slot resource with respect to the ineffectual data transmission.

In an additional aspect of the disclosure, an apparatus configured for wireless communication is provided. The apparatus includes at least one processor, and a memory coupled to the at least one processor. The at least one processor may be configured to transmit SCI reserving multiple slot resources for data transmission to one or more UEs. The at least one processor may also be configured to transmit a BCI in a transmission opportunity subsequent to a slot resource of the multiple slot resources reserved for transmission having an ineffectual data transmission associated therewith. The BCI may provide information regarding the slot resource with respect to the ineffectual data transmission.

In an additional aspect of the disclosure, an apparatus configured for wireless communication is provided. The apparatus may include means for transmitting SCI reserving multiple slot resources for data transmission to one or more UEs. The apparatus may also include means for transmitting a BCI in a transmission opportunity subsequent to a slot resource of the multiple slot resources reserved for transmission having an ineffectual data transmission associated therewith. The BCI may provide information regarding the slot resource with respect to the ineffectual data transmission.

In an additional aspect of the disclosure, a non-transitory computer-readable medium stores instructions for wireless communication is provided. When executed by a processor, the instructions may cause the processor to perform operations including transmitting SCI reserving multiple slot resources for data transmission to one or more UEs. The operations may also include transmitting a BCI in a transmission opportunity subsequent to a slot resource of the multiple slot resources reserved for transmission having an ineffectual data transmission associated therewith. The BCI may provide information regarding the slot resource with respect to the ineffectual data transmission.

In an additional aspect of the disclosure, a method of wireless communication is provided. The method may include receiving SCI reserving multiple slot resources for data transmission to one or more UEs including the UE. The method may also include receiving a BCI in a transmission opportunity subsequent to a slot resource of the multiple slot resources reserved for data transmission having an ineffectual data transmission associated therewith. The BCI may provide information regarding the slot resource with respect to the ineffectual data transmission.

In an additional aspect of the disclosure, an apparatus configured for wireless communication is provided. The apparatus includes at least one processor, and a memory coupled to the at least one processor. The at least one processor may be configured to receive SCI reserving multiple slot resources for data transmission to one or more UEs including the UE. The at least one processor may also be configured to receive a BCI in a transmission opportunity subsequent to a slot resource of the multiple slot resources reserved for data transmission having an ineffectual data transmission associated therewith. The BCI may provide information regarding the slot resource with respect to the ineffectual data transmission.

In an additional aspect of the disclosure, an apparatus configured for wireless communication is provided. The apparatus may include means for receiving SCI reserving multiple slot resources for data transmission to one or more UEs including the UE. The apparatus may also include means for receiving a BCI in a transmission opportunity subsequent to a slot resource of the multiple slot resources reserved for data transmission having an ineffectual data transmission associated therewith. The BCI may provide information regarding the slot resource with respect to the ineffectual data transmission.

In an additional aspect of the disclosure, a non-transitory computer-readable medium stores instructions for wireless communication. when executed by a processor, the instructions may cause the processor to perform operations including receiving SCI reserving multiple slot resources for data transmission to one or more UEs including the UE. The operations may also include receiving a BCI in a transmission opportunity subsequent to a slot resource of the multiple slot resources reserved for data transmission having an ineffectual data transmission associated therewith. The BCI may provide information regarding the slot resource with respect to the ineffectual data transmission.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a block diagram illustrating indications in a sidelink pointing to future resources reserved for transmission and/or retransmission of data according to one or more aspects.

FIG. 6 is a block diagram illustrating a portion of a sidelink transmission in which transmission with respect to reserved resources is ineffectual according to one or more aspects.

FIG. 7 is a flow diagram illustrating an example process that supports backward cancellation indication according to one or more aspects.

FIG. 8 is a flow diagram illustrating an example process that supports backward cancellation indication according to one or more aspects.

Like reference numbers and designations in the various drawings indicate like elements.

DETAILED DESCRIPTION

Figure 1:
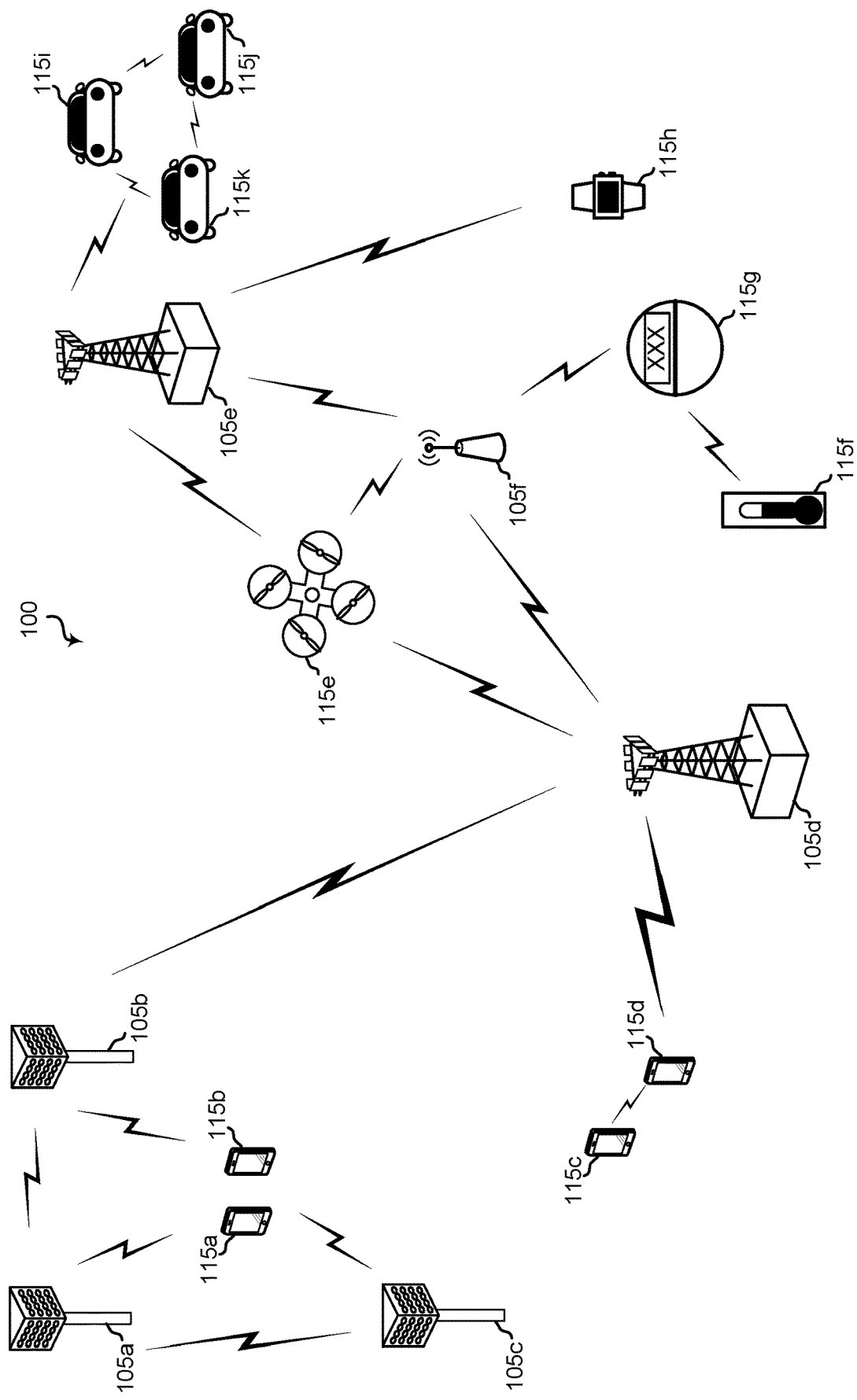
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Wireless communication networks have been widely deployed for providing and facilitating communication between two or more wireless devices. In addition to communicating with network nodes (e.g., base stations) of a wireless communication network, subscriber equipment, also known as user terminals or user equipments (UEs), may implement sidelinks with respect to one or more other UEs. Such sidelinks provide direct communication links between UEs. In operation, however, resources otherwise reserved for sidelink communications between two UEs may be preempted or collide with other communications. A UE providing sidelink transmission (e.g., a sidelink TX UE) may cancel one or more data transmissions (e.g., redundant data retransmissions) with respect to resources previously reserved for sidelink communications. A UE receiving sidelink transmissions (e.g., a sidelink RX UE) may not be aware that the sidelink TX UE skipped one or more transmission with respect to the resources previously reserved for the sidelink communications. Such operation may adversely affect decoding of data by the sidelink RX UE. For example, a sidelink RX UE unaware of a sidelink TX UE skipping sidelink data transmission using one or more resources previously reserved for sidelink communications may use data unrelated to the sidelink communications received via these resources in an attempt to decode sidelink data (e.g., soft combining spurious data received in place of the skipped sidelink transmission with data of valid sidelink transmissions for decoding the data, such as using a log likelihood ratio (LLR) process).

The present disclosure provides systems, apparatus, methods, and computer-readable media that enable and support backward cancellation indication for sidelink transmissions. For example, in a situation where a sidelink data transmission (e.g., scheduled data retransmission of a hybrid automatic repeat request (HARQ) procedure) with respect to one or more resources previously reserved for sidelink communication is ineffectual (e.g., skipped, interfered, or otherwise likely unuseful for sidelink communication) the sidelink TX UE may indicate the ineffectual data transmission in a transmission opportunity subsequent to the transmission having an ineffectual data transmission. In accordance with some aspects of the disclosure, the sidelink TX UE may transmit a backward cancellation indication (BCI) in a SCI transmission opportunity subsequent to a resource reserved for sidelink transmission having an ineffectual data transmission associated therewith. The BCI may, for example, provide information to the sidelink RX UE regarding the resource with respect to the ineffectual data transmission.

Particular implementations of the subject matter described in this disclosure may be implemented to realize one or more of the following potential advantages or benefits. In some aspects, the present disclosure provides techniques for informing sidelink RX UEs with respect to ineffectual sidelink data transmissions. Using BCIs according to some aspects of the disclosure, improved (e.g., more accurate, reliable, etc.) decoding of sidelink data may be facilitated, such as by a sidelink RX UE using BCIs to alter utilization of data received with respect to an ineffectual sidelink data transmission. In operation according to some aspects, a sidelink RX UE may use information of the ineffectual transmission to combine data transmission repetitions in a group properly, such as by discarding any LLR received on the indicated resource. For example, a sidelink RX UE may use a BCI to avoid soft combining an ineffectual (e.g., skipped) transmission which may otherwise damage the decoding of sidelink data (e.g., decoding of a physical sidelink shared channel (PSSCH)).

From the foregoing it can be appreciated that this disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., 10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105c also transmits multicast services which are subscribed to and received by UEs 115a and 115b. Such multicast services may include mobile television or stream video, or may include other services for providing community information, such as weather emergencies or alerts, such as Amber alerts or gray alerts. Macro base station 105d performs backhaul communications with base stations 105a-105c, as well as small cell, base station 105f. Macro base station 105d also serves UEs 115c and 115d.

Wireless network 100 of implementations supports mission critical communications with ultra-reliable and redundant links for mission critical devices, such UE 115e, which is a drone. Redundant communication links with UE 115e include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
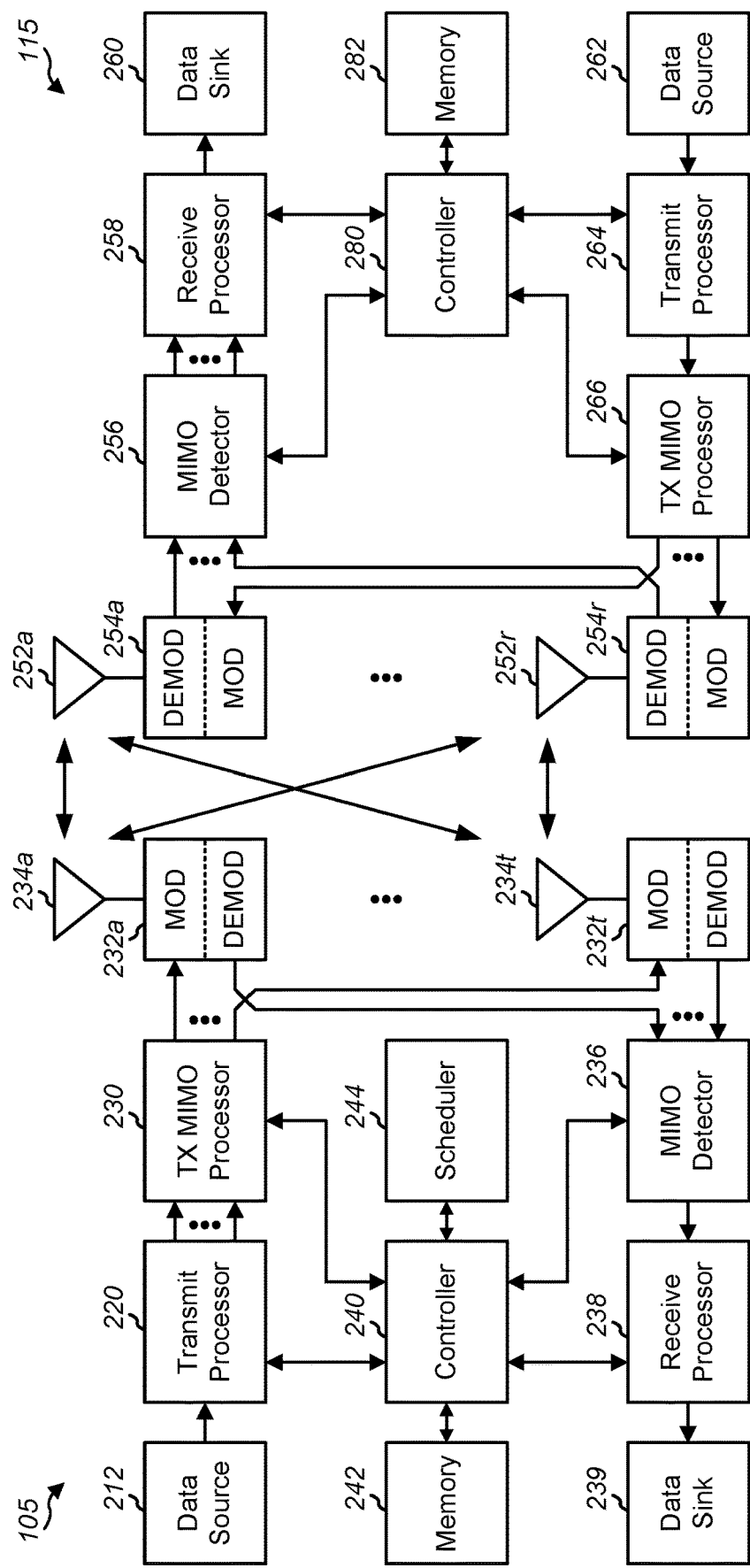
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 7 and 8, or other processes for the techniques described herein. Memories 242 and 282 may store data and program codes for base station 105 and UE 115, respectively. Scheduler 244 may schedule UEs for data transmission on the downlink or the uplink.

Figure 3:
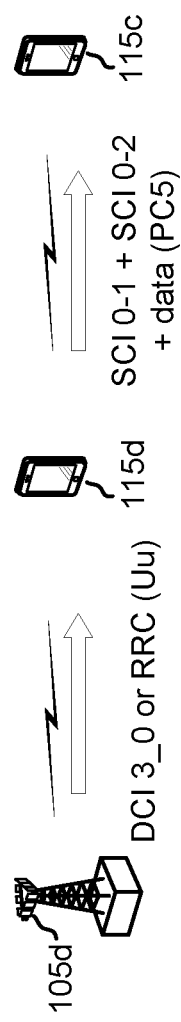
FIG. 3 is a block diagram illustrating an example of sidelink communication implemented in a wireless communication system that supports backward cancellation indication according to one or more aspects.

In addition to communicating with the network (e.g., communicating with a network node, such as a base station), a UE may implement a sidelink (i.e., communication link directly between UEs) with respect to one or more other UEs. For example, as shown in FIG. 3, UE 115*d* may communicate directly with base station 105*d* using a UE to UMTS (Uu) interface. Additionally or alternatively, a sidelink with respect to UEs 115*c* and 115*d* may be implemented using a UE to UE interface such as a PC5 interface of a mesh network.

Sidelink interface protocols may provide for dynamic and/or configured grants for sidelinks (e.g., a physical sidelink control channel (PSCCH) and/or physical sidelink shared channel (PSSCH)). A dynamic grant (DG) may provide a one-time grant of sidelink resources, such as responsive to instantaneous demand/need for sidelink communication. A configured grant (CG) may provide a grant of sidelink resources enabling continued/periodic/repeated sidelink communication.

A base station (e.g., base station 105*d*) may schedule sidelink resources to be used by a UE (e.g., UE 115*d*) for sidelink transmissions, such as via a PC5 connection, to another UE (e.g., UE 115*c*). For example, a Type 1 CG may be activated via radio resource control (RRC) signaling from the base station. As another example, Type 2 DGs and CGs may be conveyed using a DCI format 3_0 message over PDCCH. The DCI may comprise a DG and provide allocation of resources to use over a sidelink and/or the DCI can activate or deactivate a Type 2 CG for a sidelink.

A UE providing sidelink transmission (e.g., UE 115d operating as a sidelink TX UE) may provide SCI to a UE receiving sidelink transmissions (e.g., UE 115c operating as a sidelink RX UE) to schedule PSSCH and/or transmitting data through PSSCH to the sidelink RX UE. For example, SCI provided according to SCI format 0-1 may be used for scheduling PSSCH and second-stage SCI on PSSCH. SCI provided according to SCI format 0-2 may be used for decoding PSSCH. SCI format 0-1 provides fields for priority, frequency resource assignment, time resource assignment, resource reservation period, demodulation reference signal (DMRS) pattern, second-stage SCI format (broadcast, unicast, groupcast), Beta offset indicator, number of DMRS port, modulation and coding scheme (MCS), and a reserved field. SCI format 0-2 provides fields for HARQ process ID, new data indicator, redundancy version, source ID, destination ID, and channel state information (CSI) request, also if the second-stage SCI format field in the corresponding SCI provided in SCI format 0-1 indicates type 1 groupcast zone ID and communication range requirement fields are present.

Figure 4:
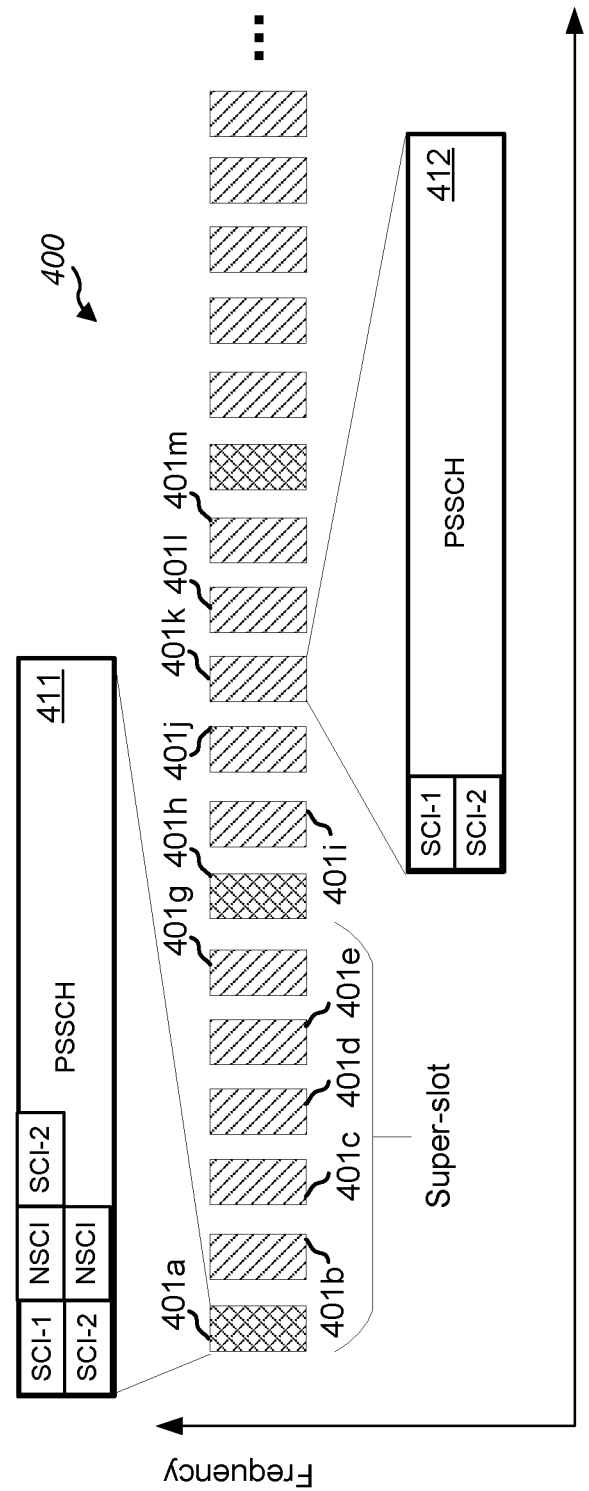
FIG. 4 is block diagram illustrating a portion of a sidelink established between UEs of a wireless network according to one or more aspects.

FIG. 4 illustrates a portion of sidelink 400 established between UEs of wireless network 100. For example, sidelink 400 may be established between UE 115d operating as a sidelink TX UE and UE 115c operating as a sidelink RX UE to implement one or more sidelink channels, such as PDCCH, PSSCH, etc. It should be understood that, although UE 115d is referred to as a sidelink TX UE and UE 115c is referred to as a sidelink RX UE, UE 115d may nevertheless receive data transmitted by UE 115c via sidelink 400 according to some implementations.

As shown in FIG. 4, sidelink channel 400 is implemented using slots 401 (e.g., time and frequency resources of a sidelink grant). A super-slot may be comprised a plurality of slots. In the example shown, a first super-slot comprises slots 401a-401g, a second super-slot comprises slots 401h-401m, and so on.

PSSCH may be transmitted on resources of the sidelink slots. For example, PSSCH may be transmitted by UE 115d and received by UE 115c using time and frequency resources of some or all of slots 401. Instances of PSSCH transmitted on the resources of particular slots may comprise various data, such as user data, control data, etc. In the illustrated example of sidelink 400, PSSCH instance 411 is shown as including SCI (e.g., first stage SCI (SCI-1), second stage SCI (SCI-2), and coverage extension SCI, referred to as new SCI (NSCI)) transmitted on some resources of slot 401a. Similarly, PSSCH instance 412 is shown in the illustrated example as including SCI (e.g., SCI-1 and SCI-2) transmitted on some resources of slot 401k. Although not explicitly designated in the illustration of FIG. 4, PSSCH instances 411 and 412 may include various data (e.g., user data, further control data, etc.) in addition to the SCI shown, such as may be transmitted on various resources of slots 401a and 401k.

Various forms of error-control may be provided with respect to data transmitted via sidelink 400. For example, forward error correction (FEC) and automatic repeat request (ARQ) of a HARQ technique may be implemented with respect to sidelink 400 of some examples. In operation according to some aspects of the present disclosure, redundant data may be transmitted by a sidelink TX UE in a plurality of repetitions or retransmissions, whereby a sidelink RX UE may implement soft combining to combine a received data block signal with corresponding retransmissions to provide robust and reliable decoding of the data (e.g., using a LLR process).

In operation according to some examples, SCI provided with respect to sidelink 400 may include information identifying current and future sidelink resources. For example, SCI (e.g., SCI-1) of PSSCH instance 411 shown in FIG. 4 may provide information regarding resources of then current slot 401a for identifying and/or decoding various data therein (e.g., SCI-2). Additionally or alternatively, SCI (e.g., SCI-1, SCI-2, and/or NSCI) of PSSCH instance 411 may provide information regarding resources of one or more the future slots (e.g., one or more of slots 401b, 401c, 401d, etc.) for identifying and/or decoding various data therein (e.g., retransmission data of an error-control technique). In operation according to aspects of the disclosure, the SCI may identify reserved future resources for transmission and/or retransmission of data. For example, SCI may identify reserved future resources for retransmissions of data (e.g., instances of scheduled retransmission of data that is carried on resources of the current slot in which the SCI is carried).

Matrix 500 of FIG. 5 illustrates indications (e.g., SCI data) in a sidelink pointing to future resources (e.g., future resources reserved for transmission and/or retransmission of data). The rows of matrix 500 represent subchannels in the frequency domain and the columns of matrix 500 represent slots in the time domain. Resources 501 and/or 502 of then current slot i include SCI reserving resources for data retransmission in then future slots i+x and i+y, wherein x and y are larger than zero (e.g., 0<x≤N and x<y≤N, and wherein N is a predetermined maximum time offset (e.g., 31, as may be determined by a number of bits available for indicating a time offset). Time domain resource assignment (TDRA) parameters implemented in existing 5G NR standards support pointing to up to two slots in the future (e.g., future slots i+x and i+y) for retransmissions.

As shown in FIG. 6, transmission (e.g., initial data transmission and/or retransmission of data) with respect to reserved resources may be preempted, collide with transmissions by or for other UEs, or otherwise be unuseful for sidelink communication, resulting in ineffectual communication of sidelink data for which the resources were previously reserved. In the example of FIG. 6, sidelink channel 600 is implemented using slots 601 (e.g., time and frequency resources of a sidelink grant), wherein then current slot 601a may provide information (e.g., SCI) identifying reserved future resources (e.g., resources of one or more of slots 601b-601e) for transmission of sidelink data. These resources reserved for the sidelink transmissions may nevertheless be preempted. For example, use of resources of slot 601e previously reserved for sidelink data transmission may be preempted (e.g., by a base station or other network node) to facilitate transmission of data having a higher priority than the sidelink data communication. As another example, signal transmission using a same time and possibly frequency resource as resources previously reserved for sidelink communication (e.g., resources of slot 601e) resulting in substantially interfered (e.g., data is rendered unrecoverable, data experiences an error rate exceeding a threshold level, data is obscured to the point that efficient recovery is not practicable, etc.) sidelink transmission may be anticipated or detected (e.g., by a base station or a sidelink TX UE). In such situations, a sidelink TX UE may cancel (e.g., skip) one or more sidelink transmissions on the reserved resources, resulting in ineffectual communication with respect to a corresponding portion of the sidelink data. Even where a sidelink TX UE proceeds to transmit sidelink data using previously reserved resources (e.g., resources of slot 601e) and a colliding signal is likewise transmitted (e.g., the sidelink TX UE fails to predict, anticipate, or even detect the colliding transmission prior to transmission of sidelink data), ineffectual communication with respect to the sidelink data may result (e.g., the sidelink transmission may be substantially interfered).

A sidelink RX UE may not be aware that a sidelink TX UE skipped one or more transmission with respect to the resources previously reserved for the sidelink communications. Similarly, a sidelink RX UE may not be aware that a colliding signal is present with respect to a sidelink transmission. Accordingly, the sidelink RX UE may use data received by the sidelink RX UE on resources previously reserved for sidelink data transmission in an attempt to decode sidelink data, wherein the data received by the sidelink RX UE may be data of poor quality, invalid data, or data otherwise unrelated to the sidelink communications. Such operation may adversely affect decoding of data (e.g., by soft combining spurious data received in place of skipped or interfered sidelink transmission with data of valid sidelink transmissions for decoding the data) by the sidelink RX UE.

In operation according to aspects of the present disclosure, a sidelink Rx UE may be informed of ineffectual sidelink transmissions (e.g., skipped, interfered, or otherwise likely unuseful for sidelink communications). In some examples, a backward cancellation indication (BCI) may be provided for use with respect to sidelink transmissions. For example, in a situation where a sidelink data transmission with respect to one or more resources previously reserved for sidelink communication is identified as ineffectual (e.g., predicted to be substantially interfered, observed to have been substantially interfered, is preempted for transmission of data unrelated to the sidelink, etc.) a sidelink TX UE may indicate the ineffectual sidelink data transmission using a BCI in accordance with concepts of the disclosure. A BCI may, for example, be transmitted in a transmission opportunity subsequent to the transmission having an ineffectual data transmission (e.g., in a next SCI transmission opportunity following the ineffectual data transmission).

BCIs utilized according to some aspects of the disclosure may provide information to sidelink RX UEs regarding ineffectual sidelink data transmission (e.g., indicating resources corresponding to ineffectual transmissions). A BCI may, for example, comprise a data packet similar to that of a preemption indication (PI) used in 5G NR (e.g., downlink PI provided via DCI 2_1 with a bitmap (14 bits) indicating a preempted resource). According to some aspects of the disclosure, a BCI may comprise one or more data packets including a bitmap and/or other data indicating one or more resources corresponding to ineffectual sidelink data transmission (e.g., indicating an exact location of a resource having ineffectual transmission(s)). Additionally or alternatively, a BCI may comprise one or more data packets including a bitmap and/or other data indicating a group of resources including one or more resources corresponding to ineffectual sidelink data transmission (e.g., indicating that at least one resource of a group of resources has ineffectual transmission(s)).

Sidelink RX UEs may utilize the BCIs provided in accordance with some aspects of the disclosure in a number of ways. For example, in operation according to some aspects, a sidelink RX UE may use information provided by a BCI to properly decode data of sidelink transmissions. For example, a sidelink RX UE may use a BCI to avoid soft combining an ineffectual (e.g., skipped, interfered, etc.) sidelink transmission which may otherwise damage the decoding of sidelink data (e.g., using a LLR process).

FIGS. 7 and 8 show flow diagrams providing operation for backward cancellation indication for sidelink transmission according to aspects of the present disclosure. In particular, flow 700 of FIG. 7 provides an example process for operation by a sidelink transmitter device (e.g., sidelink TX UE) implementing backward cancellation indication for sidelink transmission in accordance with concepts herein. Correspondingly, flow 800 of FIG. 8 provides an example process for operation by a sidelink receiver device (e.g., sidelink RX UE) implementing backward cancellation indication for sidelink transmission in accordance with concepts herein.

Referring first to FIG. 7, flow 700 illustrates an example process that supports backward cancellation indication for sidelink transmission according to one or more aspects of the present disclosure. Operations of flow 700 may be performed by a UE, such as an instance of UE 115 described above with reference to FIGS. 1-3 and a UE as described with reference to FIG. 11 below, performing functions of a sidelink TX UE. For example, operations (also referred to as "blocks") of flow 700 may be performed by and/or under control of logic of UE 115 (e.g., backward cancellation indication logic implemented by controller 280 operating to execute logic or computer instructions stored in memory 282) to support one or more backward cancellation indication functions of a sidelink TX UE described herein.

At block 701 of the example of flow 700, the UE transmits information reserving future slot resources for sidelink transmission. For example, a sidelink TX UE may transmit (e.g., using transmit processor 264, TX MIMO processor 266, MODs 254a-254r, and antennas 252a-252r operating under control of backward cancellation indication logic executed by controller 280) SCI reserving multiple slot resources for data transmission to one or more sidelink RX UEs. As described above, the information may identify reserved future resources for sidelink communication (e.g., resources for initial transmission and/or retransmission of data) by indicating particular subchannels and time slots designated for sidelink data transmission. The future resources reserved for sidelink transmission may, for example, comprise some or all of the resources scheduled (e.g., using a CG and/or DG) by a base station (e.g., one of base stations 105d) to be used for sidelink communication by a sidelink TX UE (e.g., UE 115d) with respect to one or more sidelink RX UE (e.g., UE 115c).

In operation according to some aspects of the disclosure, ineffectual data transmission with respect to one or more slot resources of the multiple slot resources reserved for transmission may be predicted, anticipated, implemented, identified, determined, observed, or otherwise detected. For example, the sidelink TX UE (e.g., UE 115d) may receive information from a network node (e.g., base station 115d) regarding preemption of one or more of the resources reserved for sidelink transmission, and thus logic (e.g., backward cancellation indication logic implemented by controller 280) of the UE may determine that sidelink data transmission on the one or more preempted resources is to be skipped. Additionally or alternatively, a network node (e.g., base station 115d) may analyze scheduling grants, anticipate or predict that one or more of the resources reserved for sidelink transmission will be substantially interfered, and provide information to the sidelink TX UE (e.g., UE 115d) regarding the one or more reserved resources likely colliding with other communications. In another example, a network node (e.g., base station 115d) may monitor the communication channel and detect instances where one or more resources reserved for sidelink transmission will be or have been substantially interfered and provide information to the sidelink TX UE (e.g., UE 115d)

regarding the one or more reserved resources colliding with other communications. In accordance with some examples, the sidelink TX UE (e.g., UE 115d) may monitor the communication channel and predict and/or detect instances where resources reserved for sidelink transmission will be or have been substantially interfered. Additionally or alternatively, the sidelink TX UE (e.g., UE 115d) may itself preempt one or more of the resources reserved for sidelink transmission, such as to perform a higher priority data transmission, and thus skip sidelink data transmission on the one or more preempted resources. Irrespective of the particular means by which the sidelink TX UE (e.g., UE 115d) obtains information regarding the resources reserved for sidelink communications being preempted or colliding with other communications, logic (e.g., backward cancellation indication logic implemented by controller 280) may operate to detect ineffectual data transmission with respect to one or more slot resources reserved for sidelink transmission, wherein the BCI may be transmitted in response to the detecting the ineffectual data transmission. Information regarding resources scheduled for sidelink communication, skipped and/or collided transmissions, determinations regarding ineffectual transmissions with respect to sidelink resources, etc. may be stored by sidelink TX UEs in one or more databases (e.g., a backward cancellation indication database).

At block 702, the UE transmits one or more BCIs for indicating ineffectual transmission with respect to one or more of the slot resources previously reserved for sidelink transmission. For example, the UE may transmit (e.g., using transmit processor 264, TX MIMO processor 266, MODs 254a-254r, and antennas 252a-252r operating under control of backward cancellation indication logic implemented executed by controller 280) a BCI in a transmission opportunity subsequent to a slot resource of the multiple slot resources reserved for transmission having an ineffectual data transmission associated therewith, wherein the BCI provides information regarding the slot resource with respect to the ineffectual data transmission. Transmitting the BCI may, for example, be provided in response to the above described detecting the ineffectual data transmission. For example, the sidelink TX UE having determined (e.g., based upon information provided by a base station, conditions observed by the UE, etc.) that sidelink transmission with respect to one or more reserved slot resources was ineffectual may transmit one or more BCIs indicating the ineffectual transmission to a sidelink RX UE.

A transmission opportunity in which a BCI is transmitted may comprise a SCI transmission opportunity (e.g., a next available SCI transmission opportunity) subsequent to the slot resource of the multiple slot resources reserved for transmission having an ineffectual data transmission associated therewith. As another example, a transmission opportunity in which a BCI is transmitted may comprise an upper layer transmission opportunity (e.g., media access control-control element (MAC-CE), RRC, etc. signaling, such as may be transmitted via PSSCH) subsequent to the slot resource of the multiple slot resources reserved for transmission having an ineffectual data transmission associated therewith.

Aspects of communication of backward cancellation indications using BCI according to concepts herein may be specified, negotiated, etc. through the use of BCI configuration signaling between various devices of the wireless communication network. For example, base station (e.g., base station 105d) may conduct BCI configuration signaling with one or more UEs (e.g., UE 115d operating as a sidelink TX UE and/or UE 115c operating as a sidelink RX UE). Additionally or alternatively, a sidelink TX UE (e.g., UE 115d) may conduct BCI configuration signaling with the one or more sidelink RX UEs (e.g., UE 115c). BCI configuration signaling implemented according to some aspects of the disclosure may, for example, be configured to establish time, frequency, format, or a combination thereof of BCI transmission occasions. Information regarding BCIs, such as BCI configuration information, instances of BCIs, etc., may be stored by sidelink TX UEs in one or more databases (e.g., a backward cancellation indication database).

Figure 9:
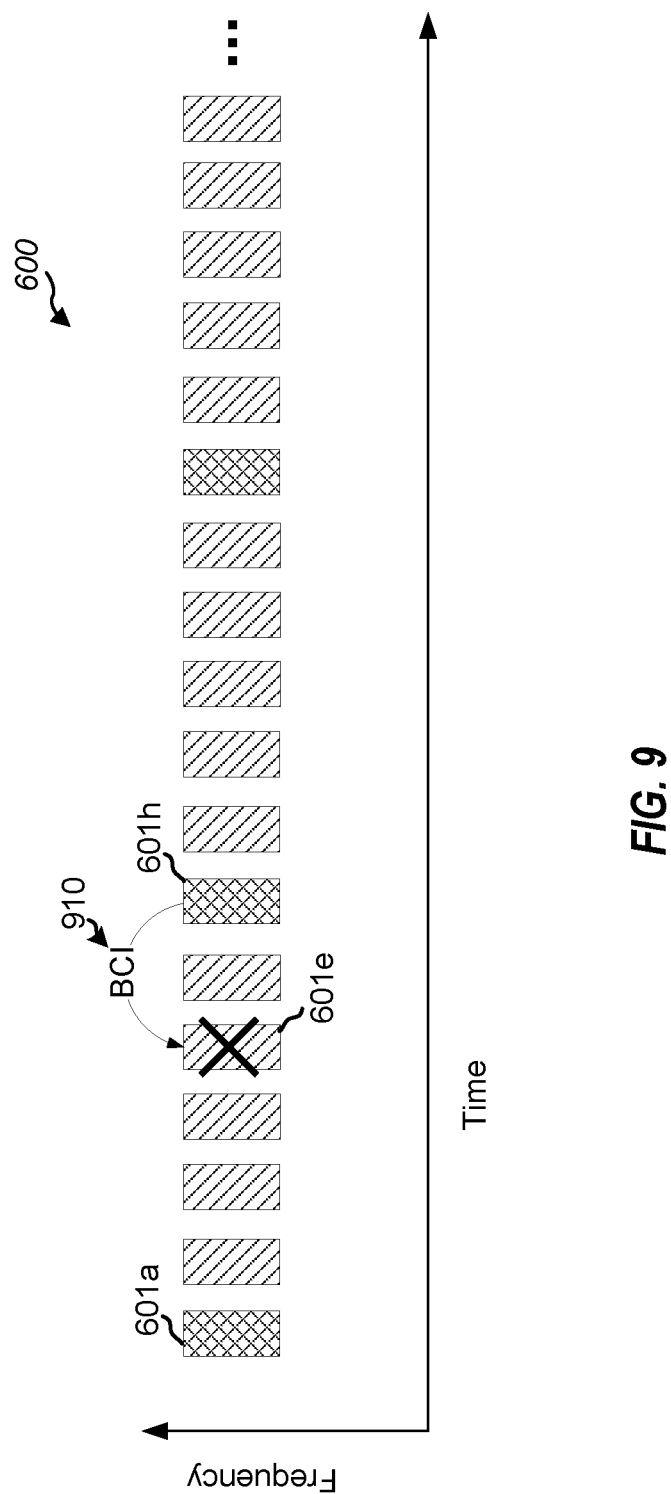
FIG. 9 is a block diagram illustrating a portion of a sidelink transmission in which a backward cancellation indication (BCI) identifies a location of a slot resource having ineffectual transmission associated therewith.

FIG. 9 shows an example of BCI being transmitted using a transmission opportunity subsequent to a slot resource reserved for transmission having an ineffectual data transmission associated therewith. For example, as discussed above with respect to FIG. 6, resources of slot 601e previously reserved for sidelink data transmission may have been preempted or substantially interfered. The sidelink TX UE may transmit BCI 910 using resources of slot 601h (e.g., a transmission opportunity subsequent to slot 601e having ineffectual data transmission associated therewith). As illustrated in FIG. 9, BCI 910 transmitted on slot 601h provides information regarding one or more slot resources with respect to ineffectual data transmission of slot 601e.

BCI 910 may identify a location of the slot resource in a time window comprising a plurality of slots. For example, a BCI transmitted according to some aspects of the disclosure may indicate an exact location (e.g., identifying the specific time and frequency resources) of one or more ineffectual transmissions in a time window (e.g., a group of slots, such as a super-slot). The BCI may include information in addition to the location of the ineffectual transmission(s), such as may comprise information regarding the type of ineffectual transmission (e.g., skipped, collided, etc.), whether the ineffectual transmission was observed or predicted, etc.

According to some example implementations in which a BCI identifies a location of the slot resource in a time window comprising a plurality of slots, a maximum length of backward indication may be defined for the BCI (e.g., the maximum length of backward indication may be limited, such as up to 4 slots in the past) and/or a maximum number of ineffectual data transmissions indicated per BCI transmission may be defined for the BCI (e.g., the maximum number of backward indications may be limited, such as up to 2 can be indicated). Wireless devices (e.g., sidelink TX UE and sidelink RX UE(s)) may negotiate aspects of BCI configuration, such as maximum length of backward indication (e.g., based on a buffer size to be used by the sidelink RX UE) and maximum number of ineffectual data transmissions indicated per BCI. The negotiation may, for example, be conducted via RRC signaling.

Figure 10:
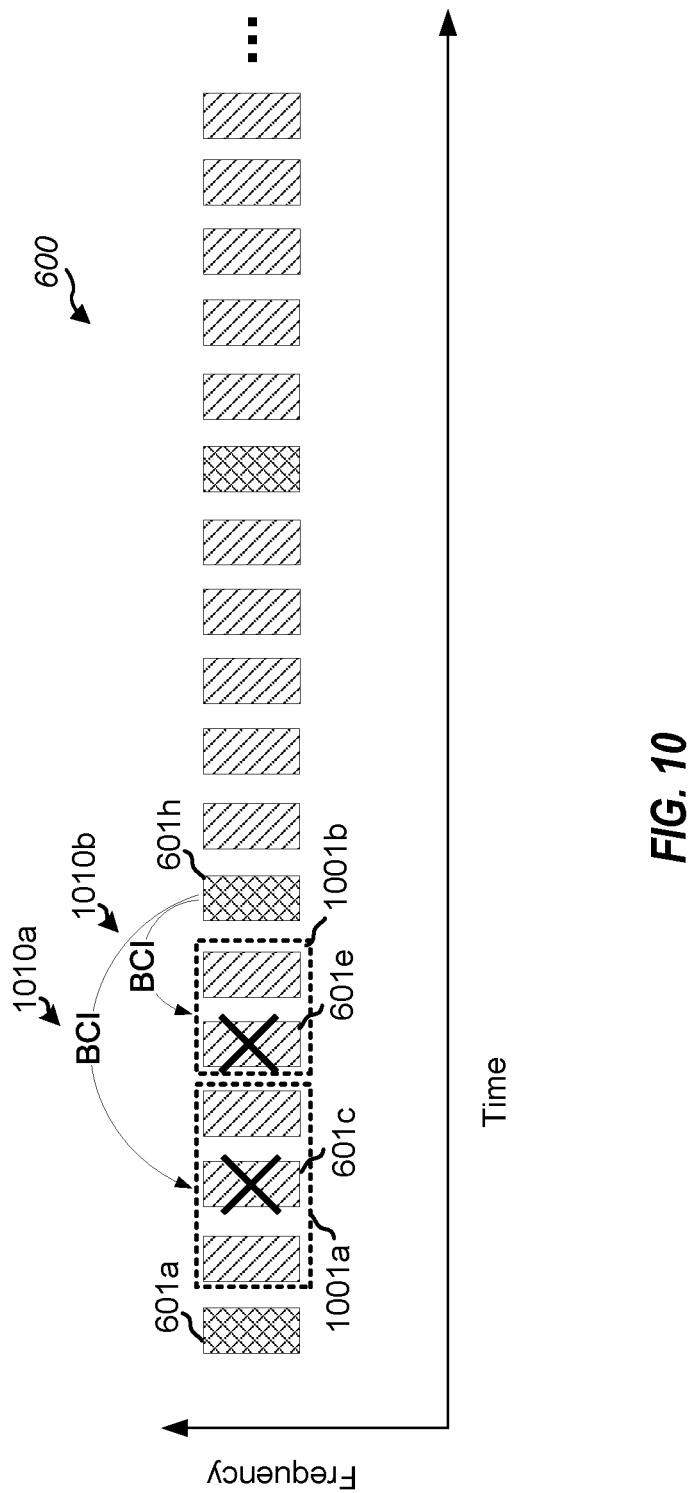
FIG. 10 is a block diagram illustrating a portion of a sidelink transmission in which BCIs identify groups of slots having ineffectual transmission associated therewith.

FIG. 10 shows another example of BCI being transmitted using a transmission opportunity subsequent to a slot resource reserved for transmission having an ineffectual data transmission associated therewith. In the example of FIG. 10, resources of slots 601c and 601e previously reserved for sidelink data transmission may have been preempted or substantially interfered. The sidelink TX UE may transmit one or more BCIs 1010 using resources of slot 601h (e.g., a transmission opportunity subsequent to slots 601c and 601e having ineffectual data transmissions associated therewith) to provide information regarding the ineffectual data transmissions.

Each of BCIs 1010a and 1010b illustrated in FIG. 10 may indicate ineffectual data transmission for a plurality of slots. For example, BCI 1010a may indicate ineffectual data transmission with respect to one or more resources of the slots of group 1001*a*. Similarly, BCI 1010*b* may indicate ineffectual data transmission with respect to one or more resources of slots of group 1001*b*. A BCI transmitted according to this example may indicate that ineffectual data transmission has been determined for a group of slots (e.g., without indicating an exact location of the one or more ineffectual transmissions within that group of slots). The size of the one or more groups may, for example, be based upon various parameters such as a buffer size to be used by the sidelink RX UE, a number of repetitions implemented with respect to transmitted data, etc. Group sizes (e.g., a number of slots comprising a slot for which a BCI is provided) may vary over time according to some aspects of the disclosure (e.g., a smaller group size may be utilized for recent data transmission repetitions and a larger group size may be utilized for older data transmission repetitions). Wireless devices (e.g., sidelink TX UE and sidelink RX UE(s)) may negotiate aspects of BCI configuration, such as group sizes, according to some aspects of the disclosure. The negotiation may, for example, be conducted via RRC signaling.

According to some example implementations in which a BCI identifies a group of slots in which ineffectual data transmission is determined, the BCI may indicate the ineffectual data transmission for the plurality of slots by providing a number of ineffectual data transmissions in the plurality of slots (e.g., a total number of skipped and/or collided data transmissions for a group of slots). Additionally or alternatively, the BCI may indicate the ineffectual data transmission for the plurality of slots by providing a percentage of ineffectual data transmissions in the plurality of slots (e.g., a percentage of skipped and/or collided data transmissions with respect to the total transmissions of a group of slots). The BCI may additionally or alternatively indicate the ineffectual data transmission for the plurality of slots by providing information designating that data transmission has been ineffectual with respect to at least one slot resource of the plurality of slots (e.g., a bit per group to indicate whether data transmission has been skipped and/or collided with respect to the respective group of slots). Additionally or alternatively, the BCI may indicate the ineffectual data transmission for the plurality of slots by providing a designator that a number of ineffectual data transmissions in the plurality of slots meets or exceeds a threshold (e.g., information regarding whether the number or percentage of skipped and/or collided data transmissions for the group of slots is larger than one or more threshold value).

Referring now to FIG. 8, flow 800 illustrates an example process that supports backward cancellation indication for sidelink transmission according to one or more aspects of the present disclosure. Operations of flow 800 may be performed by a UE, such as an instance of UE 115 described above with reference to FIGS. 1-3 and a UE as described with reference to FIG. 11 below, performing functions of a sidelink RX UE. For example, operations (also referred to as "blocks") of flow 800 may be performed by and/or under control of logic of UE 115 (e.g., backward cancellation indication logic implemented by controller 280 operating to execute logic or computer instructions stored in memory 282) to support one or more backward cancellation indication functions of a sidelink RX UE described herein.

At block 801 of the example of flow 800, the UE receives information reserving future slot resources for sidelink transmission. For example, a sidelink RX UE may receive (e.g., using antennas 252*a*-252*r*, DEMODs 254*a*-254*r*, MIMO detector 256, and receive processor 258 operating under control of backward cancellation indication logic executed by controller 280) SCI reserving multiple slot resources for data transmission to one or more UEs including the UE. As described above, the information may identify reserved future resources for sidelink communication (e.g., resources for reception of initial data transmission and/or data retransmission) by indicating particular sub-channels and time slots designated for the sidelink. Information regarding resources scheduled for sidelink communication may be stored by sidelink RX UEs in one or more databases (e.g., a backward cancellation indication database).

At block 802, the UE receives one or more BCIs providing information regarding ineffectual transmission with respect to one or more of the slot resources previously reserved for sidelink transmission. For example, the UE may receive (e.g., using antennas 252*a*-252*r*, DEMODs 254*a*-254*r*, MIMO detector 256, and receive processor 258 operating under control of backward cancellation indication logic executed by controller 280) a BCI in a transmission opportunity subsequent to a slot resource of the multiple slot resources reserved for data transmission having an ineffectual data transmission associated therewith, wherein the BCI provides information regarding the slot resource with respect to the ineffectual data transmission. The BCI may, for example, be provided in response to the sidelink TX UE detecting an ineffectual data transmission, wherein the BCI is provided in a transmission opportunity subsequent to that of the detected ineffectual data transmission. As described above, a transmission opportunity in which a BCI is transmitted may comprise various forms of transmission opportunities, such as a SCI transmission opportunity, an upper layer transmission opportunity, etc. Sidelink RX UEs according to some aspects of the disclosure may, for example, conduct BCI configuration signaling with a sidelink TX UE to establish time, frequency, format, or a combination thereof of BCI reception occasions.

In operation according to some aspects, a sidelink RX UE may use information of the ineffectual transmission provided by one or more BCI to facilitate decoding or otherwise recovering of data from received signals. For example, BCI 910 described above with respect to FIG. 9 may identify a location of the slot resource in a time window comprising a plurality of slots (e.g., indicate an exact location of one or more ineffectual transmissions in a time window). The sidelink RX UE may thus be made aware of the particular ineffectual transmissions which may otherwise damage the decoding of sidelink data (e.g., decoding of a PSSCH using a signal combining technique, such as a LLR process). For example, the sidelink RX UE may use information provided by the BCI to identify signals received on the resources of ineffectual transmissions (e.g., skipped, collided, etc. transmissions) and alter utilization of the received signal (e.g., avoid soft combining those signals in a LLR process, adjust a weighting of those signals for combining, etc.). Information regarding resources scheduled for sidelink communication, received BCIs, information provided by BCIs, determinations with respect to utilization of received signals based upon BFI information, etc. may be stored by sidelink RX UEs in one or more databases (e.g., a backward cancellation indication database).

In operation according some examples, sidelink RX UEs may buffer each of the sidelink transmissions that are received in a BCI time window, such as for use in accordance with subsequently transmitted BCI. A sidelink RX UE may thus use one or more BCIs corresponding to the buffered signals to alter utilization of the received signal buffered for a slot resource of the multiple slot resources identified by the BCI (e.g., determine which signals to combine, signals to discard, weighting of signals when combining, etc.), based upon information provided by the BCI identifying one or more locations of ineffectual transmissions with respect to the buffered signals and/or information provided by the BCI in addition to the location of the ineffectual transmission(s). Such an implementation may, for example, be well suited for use with respect to a relatively short time window, wherein less buffering is demanded of the sidelink RX UEs.

BCIs 1010*a* and 1010*b* described above with respect to FIG. 10 may provide information regarding ineffectual data transmission for a plurality of slots (e.g., BCI 1010*a* may indicate ineffectual data transmission with respect to resources of the slots of group 1001*a* and BCI 1010*b* may indicate ineffectual data transmission with respect to resources of slots of group 1001*b*). For example, in accordance with some aspects, SCI of slot 601*h* may provide BCI indicating ineffectual transmission for a respective group of slots (e.g., 4 groups each comprising 25 data repetitions). A BCI of some examples of the disclosure may indicate the ineffectual data transmission for the plurality of slots by providing a number of ineffectual data transmissions in the plurality of slots, a percentage of ineffectual data transmissions in the plurality of slots, information designating that data transmission has been ineffectual with respect to at least one slot resource of the plurality of slots, a designator that a number of ineffectual data transmissions in the plurality of slots meets or exceeds a threshold, etc., and combinations thereof. The sidelink RX UE may thus be made aware that ineffectual data transmission has been determined for a group of slots (e.g., without knowing an exact location of the one or more ineffectual transmissions within that group of slots). For example, the sidelink RX UE may use information provided by the BCI to identify a group of signals containing one or more instances of signals received on the resources of ineffectual transmissions (e.g., skipped, collided, etc. transmissions) and alter utilization of the group of received signal (e.g., discard the combined group of slots based on the indication, adjust a weighting of data obtained from the combined group of slots, etc.).

In operation according some examples, the sidelink RX UEs may buffer the sidelink transmissions of one or more groups of slots (e.g., the size of the one or more groups may be based at least in part upon sidelink RX UE buffer size), such as for use in accordance with subsequently transmitted BCI. According to some aspects of the disclosure, the sidelink RX UE may combine the signals (e.g., data repetitions, such as retransmissions of a HARQ procedure) received on the resources of a group of slots in a group right away (e.g., performing soft combining of a LLR process upon receiving the signals). The sidelink RX UE may choose to discard or keep, or otherwise alter utilization of the combined received signals, for the group of slots based on the indication provided by a respective BCI. As an example, the sidelink RX UE may determine to alter (e.g., discard, reduce weighting, etc.) the utilization of the combined group signal if a number of ineffectual data transmissions in the group of slots is greater than a threshold value (e.g., a predetermined number of ineffectual transmissions, a predetermined number of slots containing ineffectual transmissions, etc.), and may determine to not alter utilization (e.g., keep, retain weighting, etc.) of the combined group signal if the number of ineffectual data transmission in the group of slots is less than the threshold. As another example, the sidelink RX UE may additionally or alternatively determine to alter the utilization of the combined group signal if a percentage of ineffectual data transmissions in the group of slots is greater than a threshold value (e.g., a predetermined percentage of ineffectual transmissions of the total transmissions provided on the group of slots, a predetermined percentage of slots containing ineffectual transmissions, etc.), and may determine to not alter utilization of the combined group signal if the percentage of ineffectual data transmissions in the group of slots is less than the threshold. Additionally or alternatively, the sidelink RX UE may determine to alter utilization of the combined group signal if information (e.g., a bit of a bitmap corresponding to groups of slots) of the BCI designates that data transmission has been ineffectual with respect to at least one slot resource of the group of slots. The sidelink RX UE may additionally or alternatively determine to alter utilization of the combined group signal if a designator (e.g., a bit of a bitmap corresponding to groups of slots) of the BCI indicates that a number of ineffectual data transmissions in the group of slots meets or exceeds a threshold value (e.g., a predetermined number of ineffectual transmissions, a predetermined number of slots containing ineffectual transmissions, etc.).

Determination by a sidelink RX UE to alter utilization of signals received on one or more slot resources may be based on information in addition to that provided by respective BCI. For example, in accordance with some aspects of the disclosure, determining to alter utilization of received signals (e.g., discard or keep a particular received signal, a combined group signal, etc.) may be based at least in part in an interference measurement (e.g., channel busy ratio (CBR), signal to noise ratio (SNR), etc.) made by the UE receiving signals of the slot resources.

Figure 11:
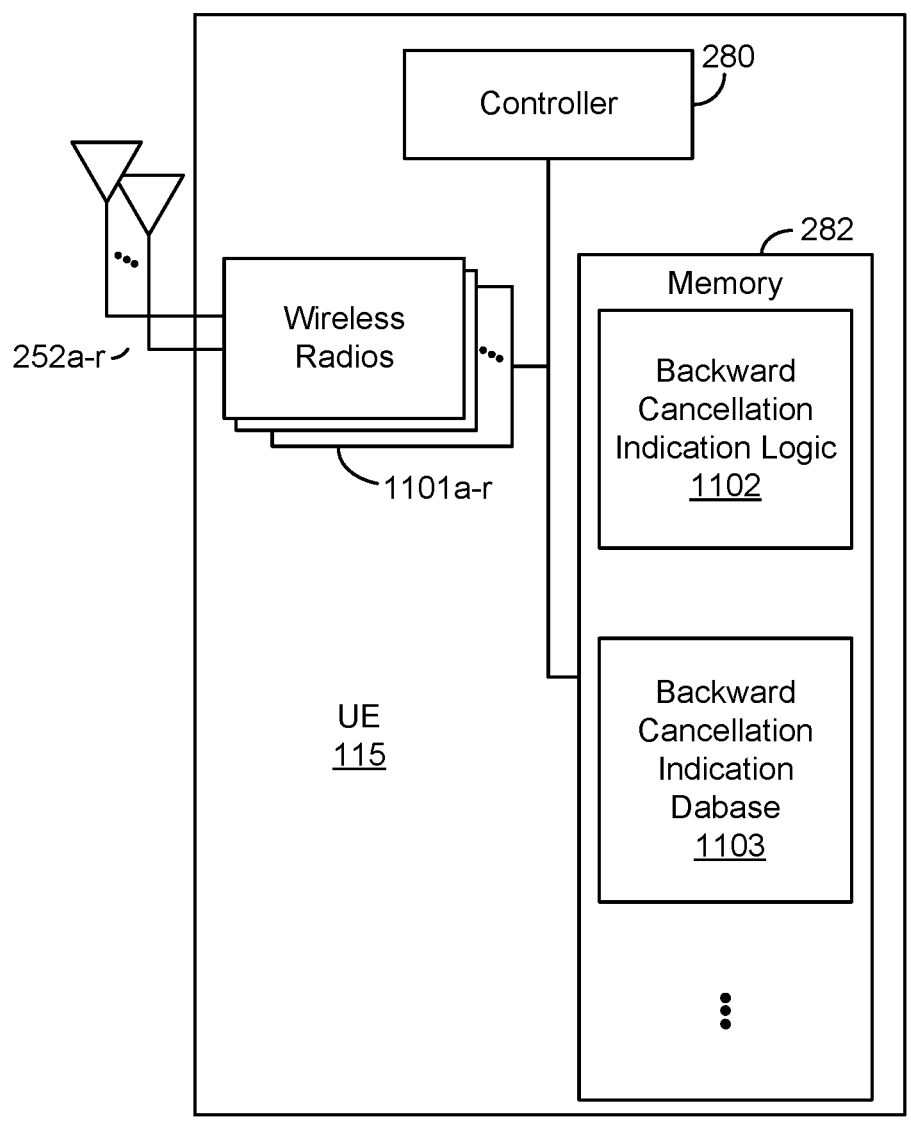
FIG. 11 is a block diagram of an example UE that supports backward cancellation indication according to one or more aspects.

FIG. 11 is a block diagram of an example UE 115 that supports backward cancellation indication for UE sidelink transmission according to one or more aspects of the disclosure. UE 115 shown in FIG. 11 may be configured to perform operations of a sidelink TX UE implementing backward cancellation indication for UE sidelink transmission, including the blocks of a process described with reference to FIG. 7. Additionally or alternatively, UE 115 shown in FIG. 11 may be configured to perform operations of a sidelink RX UE implementing backward cancellation indication for UE sidelink transmission, including the blocks of a process described with reference to FIG. 8. In some implementations, UE 115 includes the structure, hardware, and components shown and described with reference to UE 115 of FIGS. 1 and 2. For example, UE 115 includes controller 280, which operates to execute logic or computer instructions stored in memory 282, as well as controlling the components of UE 115 that provide the features and functionality of UE 115. UE 500, under control of controller 280, transmits and receives signals via wireless radios 1101*a-r* and antennas 252*a-r*. Wireless radios 1101*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include backward cancellation indication logic 1102, and backward cancellation indication database 1103. Backward cancellation indication logic 1102 may be configured to control, perform, manage, etc. one or more functions of a backward cancellation indication process implemented according to aspects of the present disclosure. Backward cancellation indication database 1103 may be configured to store various data (e.g., information regarding resources scheduled for sidelink communication, skipped and/or collided transmissions, determinations regarding ineffectual transmissions with respect to sidelink resources, BCI configuration, instances of BCIs, information provided by BCIs, determinations with respect to utilization of received signals based upon BFI information, etc.) utilized with respect to a backward cancellation process of some aspects. UE 115 may receive signals from or transmit signals to one or more network entities, such as base station 105 of FIGS. 1-3.

1. Methods, apparatuses, and articles for wireless communication may provide for transmitting SCI reserving multiple slot resources for data transmission to one or more UEs, and transmitting a BCI in a transmission opportunity subsequent to a slot resource of the multiple slot resources reserved for transmission having an ineffectual data transmission associated therewith, wherein the BCI provides information regarding the slot resource with respect to the ineffectual data transmission.

2. The methods, apparatuses, and articles of clause 1, further providing for conducting BCI configuration signaling with the one or more UEs, wherein the BCI configuration signaling is configured to establish time, frequency, format, or a combination thereof of BCI transmission occasions.

3. The methods, apparatuses, and articles of any of clauses 1-2, further providing for detecting the ineffectual data transmission with respect to the slot resource of the multiple slot resources reserved for transmission, wherein the transmitting the BCI is in response to the detecting the ineffectual data transmission.

4. The methods, apparatuses, and articles of any of clauses 1-3, wherein the BCI identifies a location of the slot resource in a time window comprising a plurality of slots.

5. The methods, apparatuses, and articles of any of clauses 1-4, wherein a maximum length of backward indication is defined for the BCI.

6. The methods, apparatuses, and articles of any of clauses 1-5, wherein a maximum number of ineffectual data transmissions indicated per BCI transmission is defined for the BCI.

7. The methods, apparatuses, and articles of any of clauses 1-3 and 5-6, wherein the BCI indicates ineffectual data transmission for a plurality of slots.

8. The methods, apparatuses, and articles of clause 7, wherein the BCI indicates the ineffectual data transmission for the plurality of slots by providing one or more of a number of ineffectual data transmissions in the plurality of slots, a percentage of ineffectual data transmissions in the plurality of slots, a bit designating that data transmission has been ineffectual with respect to at least one slot resource of the plurality of slots, or a designator that a number of ineffectual data transmissions in the plurality of slots meets or exceeds a threshold.

9. The methods, apparatuses, and articles of clause 7, wherein a size of the plurality of slots is based at least in part on a buffer size of the UE buffer or a number of repetitions for data transmission.

10. The methods, apparatuses, and articles of clause 7, wherein a number of slots comprising the plurality of slots varies over time.

11. Methods, apparatuses, and articles for wireless communication may provide for receiving SCI reserving multiple slot resources for data transmission to one or more UEs including the UE, and receiving a BCI in a transmission opportunity subsequent to a slot resource of the multiple slot resources reserved for data transmission having an ineffectual data transmission associated therewith, wherein the BCI provides information regarding the slot resource with respect to the ineffectual data transmission.

12. The methods, apparatuses, and articles of clause 11, further providing for conducting BCI configuration signaling with a sidelink transmission UE providing the data transmission to the one or more UEs, wherein the BCI configuration signaling is configured to establish time, frequency, format, or a combination thereof of BCI reception occasions.

13. The methods, apparatuses, and articles of any of clauses 11-12, wherein the BCI identifies a location of the slot resource in a time window comprising a plurality of slots.

14. The methods, apparatuses, and articles of any of clauses 11-13, further providing for buffering a received signal for each slot resource of the multiple slot resources in a time window comprising a plurality of slots.

15. The methods, apparatuses, and articles of clause 14, further providing for altering utilization of the received signal buffered for a slot resource of the multiple slot resources identified by the BCI.

16. The methods, apparatuses, and articles of any of clauses 11-15, wherein the BCI indicates ineffectual data transmission for a plurality of slots.

17. The methods, apparatuses, and articles of any of clauses 11-13, wherein the BCI indicates ineffectual data transmission for a plurality of slots by providing one or more of a number of ineffectual data transmissions in the plurality of slots, a percentage of ineffectual data transmissions in the plurality of slots, a bit designating that data transmission has been ineffectual with respect to at least one slot resource of the plurality of slots, or a designator that a number of ineffectual data transmissions in the plurality of slots meets or exceeds a threshold.

18. The methods, apparatuses, and articles of any of clauses 11-17, further comprising:
combining a received signal for each slot resource of the multiple slot resources in a time window comprising a plurality of slots to provide a combined group signal; and
determining to alter utilization of the combined group signal based at least in part on an indication provided by the BCI.

19. The methods, apparatuses, and articles of clause 18, wherein determining to alter utilization of the combined group signal based at least in part on the indication provided by the BCI determines to discard the combined group signal if a number of ineffectual data transmissions in the plurality of slots is greater than a threshold and determines to keep the combined group signal if the number of ineffectual data transmission in the plurality of slots is less than the threshold.

20. The methods, apparatuses, and articles of any of clauses 18-19, wherein determining to alter utilization of the combined group signal based at least in part in an interference measurement made by the UE receiving signals of the slot resources of the multiple slot resources.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-11 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   transmitting sidelink control information (SCI) reserving multiple slot resources for data transmission to one or more UEs; and
   transmitting a backward cancellation indication (BCI) in a transmission opportunity subsequent to a slot resource of the multiple slot resources reserved for transmission having an ineffectual data transmission associated therewith, wherein the BCI provides information regarding the slot resource with respect to the ineffectual data transmission, wherein the BCI is configured for the one or more UEs determining to discard a combined group signal from a plurality of slots when a number of ineffectual data transmissions in the plurality of slots is greater than a threshold and determining to keep the combined group signal from the plurality of slots when the number of ineffectual data transmission in the plurality of slots is less than the threshold.

2. The method of claim 1, further comprising:
   conducting BCI configuration signaling with the one or more UEs, wherein the BCI configuration signaling is configured to establish time, frequency, format, or a combination thereof of BCI transmission occasions.

3. The method of claim 1, further comprising:
   detecting the ineffectual data transmission with respect to the slot resource of the multiple slot resources reserved for transmission, wherein the transmitting the BCI is in response to the detecting the ineffectual data transmission.

4. The method of claim 1, wherein the BCI identifies a location of the slot resource in a time window comprising a plurality of slots.

5. The method of claim 1, wherein a maximum length of backward indication is defined for the BCI.

6. The method of claim 1, wherein a maximum number of ineffectual data transmissions indicated per BCI transmission is defined for the BCI.

7. The method of claim 1, wherein the BCI indicates ineffectual data transmission for a plurality of slots.

8. The method of claim 7, wherein the BCI indicates the ineffectual data transmission for the plurality of slots by providing one or more of:
   a number of ineffectual data transmissions in the plurality of slots;
   a percentage of ineffectual data transmissions in the plurality of slots;
   a bit designating that data transmission has been ineffectual with respect to at least one slot resource of the plurality of slots; or
   a designator that a number of ineffectual data transmissions in the plurality of slots meets or exceeds the threshold.

9. The method of claim 7, wherein a size of the plurality of slots is based at least in part on a buffer size of the UE buffer or a number of repetitions for data transmission.

10. The method of claim 7, wherein a number of slots comprising the plurality of slots varies over time.

11. A user equipment (UE) comprising:
    a memory storing processor-readable code; and
    at least one processor coupled to the memory, the at least one processor configured to execute the processor-readable code to cause the at least one processor to:
       transmit sidelink control information (SCI) reserving multiple slot resources for data transmission to one or more UEs; and
       transmit a backward cancellation indication (BCI) in a transmission opportunity subsequent to a slot resource of the multiple slot resources reserved for transmission having an ineffectual data transmission associated therewith, wherein the BCI provides information regarding the slot resource with respect to the ineffectual data transmission, wherein the BCI is configured for the one or more UEs determining to discard a combined group signal from a plurality of slots when a number of ineffectual data transmissions in the plurality of slots is greater than a threshold and determining to keep the combined group signal from the plurality of slots when the number of ineffectual data transmission in the plurality of slots is less than the threshold.

12. The UE of claim 11, wherein the at least one processor is configured to execute the processor-readable code to further cause the at least one processor to:
conduct BCI configuration signaling with the one or more UEs, wherein the BCI configuration signaling is configured to establish time, frequency, format, or a combination thereof of BCI transmission occasions.

13. The UE of claim 11, wherein the at least one processor is configured to execute the processor-readable code to further cause the at least one processor to:
detect the ineffectual data transmission with respect to the slot resource of the multiple slot resources reserved for transmission, wherein the transmitting the BCI is in response to the detecting the ineffectual data transmission.

14. The UE of claim 11, wherein the BCI identifies a location of the slot resource in a time window comprising a plurality of slots.

15. The UE of claim 11, wherein the BCI indicates ineffectual data transmission for a plurality of slots by providing one or more of:
a number of ineffectual data transmissions in the plurality of slots;
a percentage of ineffectual data transmissions in the plurality of slots;
a bit designating that data transmission has been ineffectual with respect to at least one slot resource of the plurality of slots; or
a designator that a number of ineffectual data transmissions in the plurality of slots meets or exceeds the threshold.

16. A method of wireless communication performed by a user equipment (UE), the method comprising:
receiving sidelink control information (SCI) reserving multiple slot resources for data transmission to one or more UEs including the UE;
receiving a backward cancellation indication (BCI) in a transmission opportunity subsequent to a slot resource of the multiple slot resources reserved for data transmission having an ineffectual data transmission associated therewith, wherein the BCI provides information regarding the slot resource with respect to the ineffectual data transmission
combining a received signal for each slot resource of the multiple slot resources in a time window comprising a plurality of slots to provide a combined group signal; and
determining to alter utilization of the combined group signal based at least in part on an indication provided by the BCI, wherein determining to alter utilization of the combined group signal based at least in part on the indication provided by the BCI determines to discard the combined group signal when a number of ineffectual data transmissions in the plurality of slots is greater than a threshold and determines to keep the combined group signal when the number of ineffectual data transmission in the plurality of slots is less than the threshold.

17. The method of claim 16, further comprising:
conducting BCI configuration signaling with a sidelink transmission UE providing the data transmission to the one or more UEs, wherein the BCI configuration signaling is configured to establish time, frequency, format, or a combination thereof of BCI reception occasions.

18. The method of claim 16, wherein the BCI identifies a location of the slot resource in a time window comprising a plurality of slots.

19. The method of claim 16, further comprising:
buffering a received signal for each slot resource of the multiple slot resources in a time window comprising a plurality of slots.

20. The method of claim 19, further comprising:
altering utilization of the received signal buffered for a slot resource of the multiple slot resources identified by the BCI.

21. The method of claim 16, wherein the BCI indicates ineffectual data transmission for a plurality of slots.

22. The method of claim 21, wherein the BCI indicates the ineffectual data transmission for the plurality of slots by providing one or more of:
a number of ineffectual data transmissions in the plurality of slots;
a percentage of ineffectual data transmissions in the plurality of slots;
a bit designating that data transmission has been ineffectual with respect to at least one slot resource of the plurality of slots; or
a designator that a number of ineffectual data transmissions in the plurality of slots meets or exceeds the threshold.

23. The method of claim 16, wherein determining to alter utilization of the combined group signal is based at least in part in an interference measurement made by the UE receiving signals of the slot resources of the multiple slot resources.

24. A user equipment (UE) comprising:
a memory storing processor-readable code; and
at least one processor coupled to the memory, the at least one processor configured to execute the processor-readable code to cause the at least one processor to:
receive sidelink control information (SCI) reserving multiple slot resources for data transmission to one or more UEs including the UE;
receive a backward cancellation indication (BCI) in a transmission opportunity subsequent to a slot resource of the multiple slot resources reserved for data transmission having an ineffectual data transmission associated therewith, wherein the BCI provides information regarding the slot resource with respect to the ineffectual data transmission
combine a received signal for each slot resource of the multiple slot resources in a time window comprising a plurality of slots to provide a combined group signal; and
determine to alter utilization of the combined group signal based at least in part on an indication provided by the BCI, wherein determining to alter utilization of the combined group signal based at least in part on the indication provided by the BCI determines to discard the combined group signal when a number of ineffectual data transmissions in the plurality of slots is greater than a threshold and determines to keep the combined group signal when the number of ineffectual data transmission in the plurality of slots is less than the threshold.

25. The UE of claim 24, wherein the BCI identifies a location of the slot resource in a time window comprising a plurality of slots.

26. The UE of claim 24, wherein the at least one processor is configured to execute the processor-readable code to further cause the at least one processor to:

buffer a received signal for each slot resource of the multiple slot resources in a time window comprising a plurality of slots; and alter utilization of the received signal buffered for a slot resource of the multiple slot resources identified by the BCI.

27. The UE of claim 24, wherein the BCI indicates ineffectual data transmission for a plurality of slots by providing one or more of:

a number of ineffectual data transmissions in the plurality of slots;

a percentage of ineffectual data transmissions in the plurality of slots;

a bit designating that data transmission has been ineffectual with respect to at least one slot resource of the plurality of slots; or a designator that a number of ineffectual data transmissions in the plurality of slots meets or exceeds the threshold.

* * * * *